United States Patent [19]

Ragan et al.

[11] Patent Number: 4,682,223

[45] Date of Patent: * Jul. 21, 1987

[54] DESCRAMBLER UNIT METHOD AND APPARATUS FOR TELEVISION SIGNAL DESCRAMBLING

[75] Inventors: Lawrence H. Ragan, Dallas; Clinton S. Hartmann, Carrollton; Darrell L. Ash, Garland, all of Tex.

[73] Assignee: R. F. Monolithics, Inc., Dallas, Tex.

[*] Notice: The portion of the term of this patent subsequent to Jul. 21, 2004 has been disclaimed.

[21] Appl. No.: 547,027

[22] Filed: Oct. 31, 1983

[51] Int. Cl.[4] .................... H04N 7/167; G06K 19/06; G06F 7/04

[52] U.S. Cl. ................................ 380/16; 340/825.31; 235/487; 235/492; 380/10

[58] Field of Search ............... 358/114, 120, 115, 123; 235/380, 382, 487, 492, 382.5; 340/825.31, 825.33, 825.34

[56] References Cited

U.S. PATENT DOCUMENTS

| | | | |
|---|---|---|---|
| 3,531,582 | 9/1970 | Walker | 358/115 |
| 3,736,369 | 5/1973 | Vogelman et al. | |
| 3,813,482 | 5/1974 | Blonder | 358/120 |
| 3,890,461 | 7/1975 | Vogelman et al. | 358/115 |
| 3,906,201 | 9/1975 | Housman et al. | 235/492 |
| 4,081,832 | 3/1978 | Sherman | 358/122 |
| 4,210,900 | 7/1980 | Shavit | 235/382 |
| 4,433,207 | 2/1984 | Best | 178/22.09 |
| 4,471,379 | 9/1984 | Stephens | 358/120 |
| 4,528,588 | 7/1985 | Löfberg | 358/122 |

FOREIGN PATENT DOCUMENTS

| | | | |
|---|---|---|---|
| 8103593 | 12/1981 | PCT Int'l Appl. | 358/114 |
| 2113940 | 8/1983 | United Kingdom | 358/120 |

Primary Examiner—Stephen C. Buczinski
Assistant Examiner—Linda J. Wallace
Attorney, Agent, or Firm—Sigalos & Levine

[57] ABSTRACT

A method of descrambling received video program signals with transmitted synchronization signals for use in a video receiver comprising the steps of providing first terminals for receiving the scrambled video signal and second terminals coupled to the video receiver and connecting an electronic ticket containing descrambling circuitry to the first terminals for receiving and descrambling the received video signal and coupling the descrambled video signal from the electronic ticket to the second terminals for transfer to the video receiver.

23 Claims, 11 Drawing Figures

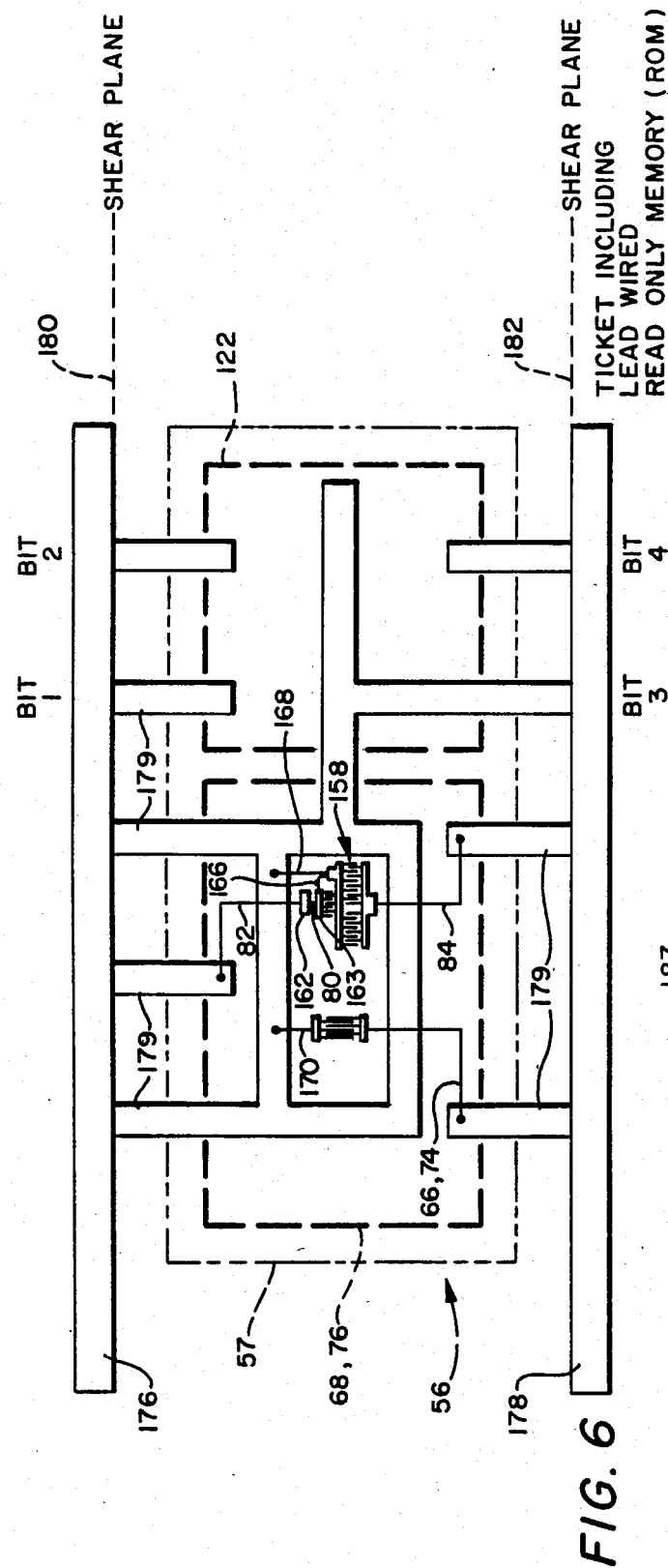
FIG. 6
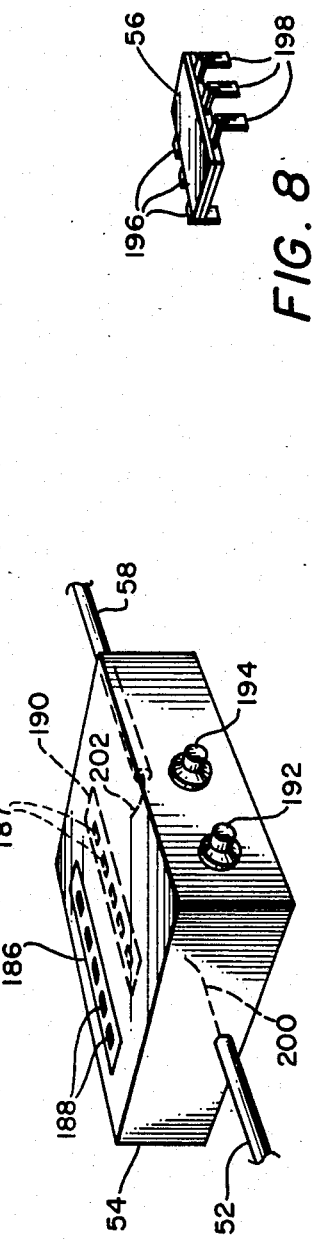
FIG. 8
FIG. 7

DESCRAMBLER UNIT METHOD AND APPARATUS FOR TELEVISION SIGNAL DESCRAMBLING

TECHNICAL FIELD

This invention relates to methods and apparatus for preventing a television signal from being acceptably received by an unauthorized television receiver while maintaining the television signal recoverable by an authorized receiver.

It particularly relates to a descrambling unit having an electronic ticket associated with it for receiving a scrambled video program signal and providing a descrambled video signal to a video receiver. The electronic ticket contains at least a portion of the descrambling circuit and is a plug-in, throw away unit. A valid electronic ticket is purchased and plugged into the descrambler unit thus enabling the descrambling unit to provide descrambled signals to a video display device. If an invalid ticket is attempted to be used, it will be rendered unusable by a signal accompanying the scrambled video signal. Further, after a selected program has been substantially transmitted, a "valid" ticket will self-destruct so that it cannot be used again.

Subscription television is now in wide and growing use in both cable television and over-the-air systems. In over-the-air systems, preventing unauthorized receivers from receiving the transmission is a major problem for subscription services, but even cable television systems might desire to have different classes of customers which can be serviced over the same cable. For instance, a special rate might be charged for customers who want to view certain sporting events or first run movies. In order to solve these problems, many systems have been developed for preventing the reception of an acceptable television signal by unauthorized receivers.

BACKGROUND ART

Methods of scrambling and descrambling television signals to prevent unauthorized viewing of protected material have been proposed almost since the inception of television. Everything from moving mirrors shown in U.S. Pat. No. 2,531,974, to inserted carriers shown in U.S. Pat. No. 4,074,311 have been proposed. Some systems in use today seek to modify the synchronization pulses in the video signal as shown in U.S. Pat. No. 3,924,059 or insert interfering video signals which are subsequently removed in the descrambling device as shown in U.S. Pat. No. 4,112,464 or insert interfering carriers at the transmitter which are subsequently removed in the descrambling device with notch filters as shown in U.S. Pat. No. 4,074,311.

Randomized switching between inverted and non-inverted video is expensive to perform in the decoder function, requiring demodulation of the received coded signal, and in the case of a decoder which sits on the top of a video set, the remodulation of the signal after it has been restored to viewable condition. While the systems using injection of interfering carrier systems do not require demodulation and remodulation, they have other disadvantages. For instance, such systems can be easily defeated by persons with only modest means and effort. Also, extra transmitter power must be devoted to the interfering carrier. This is detrimental in cable systems, not so much for the slight penalty in consumed energy, but to the care and expense that is involved in maintaining linearity in all the amplifiers that must amplify the signals. The linearity problem becomes especially severe in over-the-air transmission systems because of the high transmitter power involved.

Further, synchronization pulse modification or suppression system techniques are easy to defeat. On the other hand these techniques lead to very effective scrambling and good quality pictures after descrambling. By combining this technique with the present invention, a scrambling-descrambling system is obtained that is both secure and low in cost and delivers good quality descrambled video signals.

DISCLOSURE OF THE INVENTION

The present invention overcomes the disadvantages of the prior art by providing a television scrambling and unscrambling system which utilizes a decoder or descrambler in the video signal receiving network which has an "electronic ticket" forming a part thereof and which is a removable part of the circuit and necessary to descramble the signal. The electronic ticket can be purchased for a particular program and inserted in the decoder which is coupled to the video set of the user. The ticket includes a surface acoustic wave (SAW) device which, in particular, can be used as a delay line to descramble the signal being received for viewing.

A "fusible link" is formed in the video signal path on the surface of the SAW device which is destroyed by circuitry in the decoder when a coded verification signal is transmitted with the scrambled signal. All unauthorized tickets which are active at the time a verification signal is transmitted are effectively disabled by the decoder which destroys the fusible link and renders the ticket unusable.

The SAW device ticket is packaged in plastic in such a way that the SAW device is almost certain to be destroyed by opening the package. This means that the device is largely non-reproducible.

The electronic ticket can also include a ROM (read only memory) which contains a code to identify proper tickets for use with particular programs. In the event the code produced by a particular ticket does not agree with the verification code transmitted with the scrambled signal, the invalid or unauthorized ticket will be rendered unusable by the fusible link being destroyed.

Inasmuch as the attenuation may vary from ticket to ticket, a variable attenuator is provided to balance the system and compensate for insertion loss differences of the SAW device from ticket to ticket.

In addition, a variable phase shifter is provided for matching variations in phase shift or delay variations from ticket to ticket.

SUMMARY OF THE PRESENT INVENTION

The invention relates to apparatus for descrambling a transmitted, scrambled video program and synchronization signals for use in a video display comprising a descrambler with a receptacle for receiving an electronic ticket, said descrambler having first terminals therein for receiving said transmitted scrambled video signal and second terminals therein for coupling said descrambled signal to said display for viewing, an electronic ticket for insertion in said receptacle, said ticket having circuitry for connection to said descrambler for receiving said scrambled signal, said circuitry being necessary for said descrambler to descramble said received video signal and providing said descrambled video signal to said second terminals for coupling to said display, means coupled to said ticket for verifying an authorized ticket inserted in said receptacle, and means coupled to said verifying means and said ticket for deactivating any unauthorized ticket inserted in said receptacle.

Finally, the invention relates to a method of descrambling video program and synchronization signals for use in a video display comprising the steps of providing first terminals for receiving said scrambled video signal, coupling second terminals to said video display, and coupling an electronic ticket containing descrambling circuitry to said first terminal for receiving and descrambling at least a portion of said received video signal and coupling said descrambled video signal to said second terminals for transfer to said video display.

BRIEF DESCRIPTION OF THE DRAWINGS

Other and further objects and advantages of the present invention will become apparent to those skilled in the art upon a study of the following specification, appended claims, and accompanying drawings in which like numerals represent like elements and wherein;

FIG. 6 is a diagrammatic representation of the manner of construction of the electronic ticket on a surface acoustic wave device and includes a read only memory decoder for identifying the respective ticket;

FIG. 7 is a representation of a descrambler having a receptacle for the electronic ticket and necessary controls thereon;

FIG. 8 is a diagrammatic representation of an electronic ticket which could be used with the descrambler of FIG. 7;

DETAILED DESCRIPTION OF THE DRAWINGS

Figure 1:
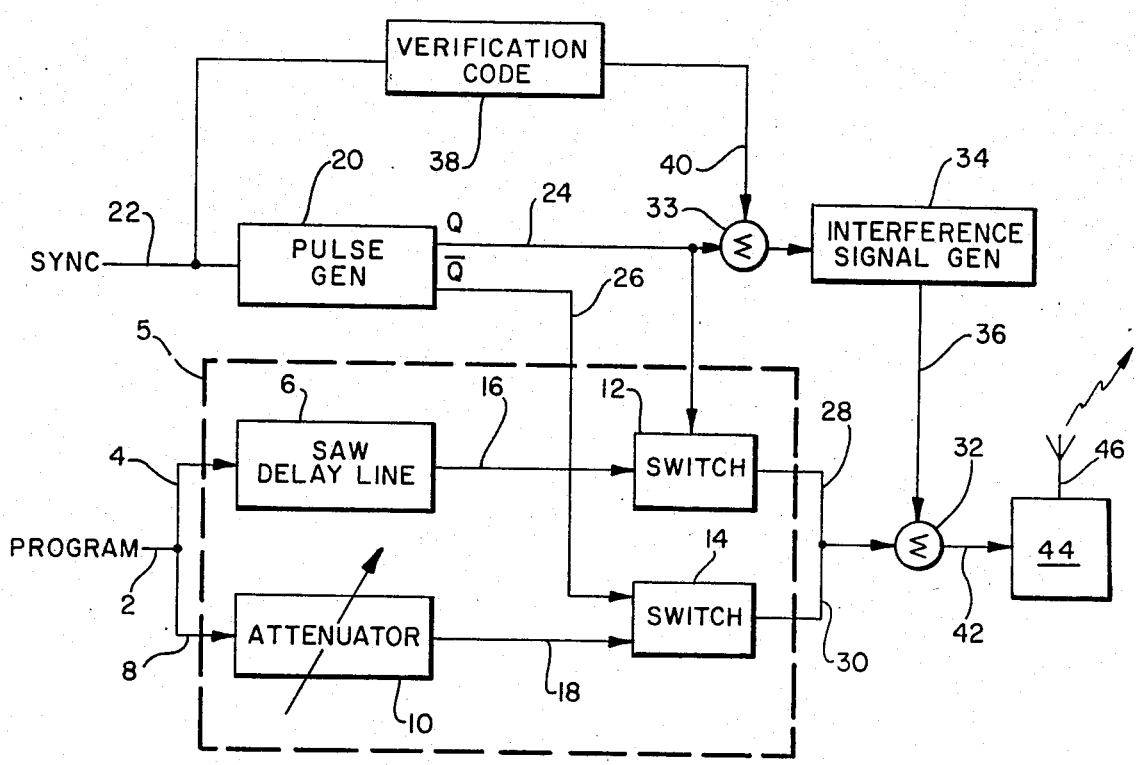
FIG. 1 is a schematic diagram of the apparatus for scrambling a video program signal and transmitting said scrambled signal along with synchronization signals, an interference signal and a verification code to television receivers or displays.
Figure 2:
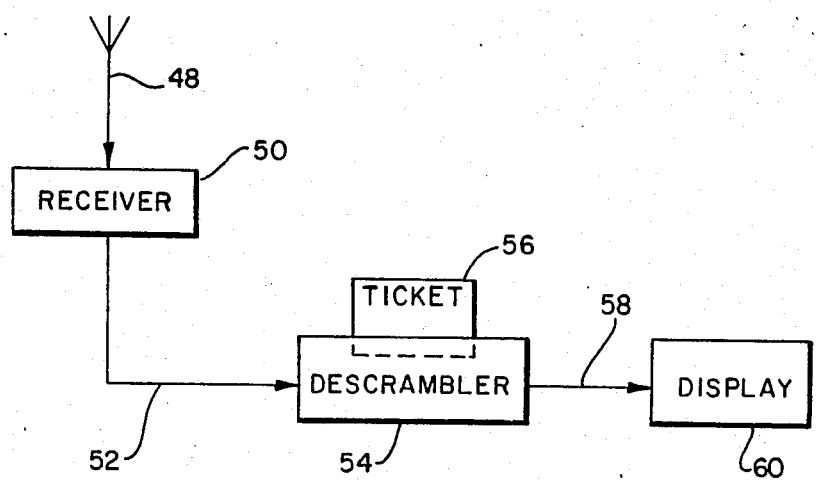
FIG. 2 is a schematic representation of a typical receiver coupled to a display unit through a descrambling unit which has an electronic ticket enabling said signal to be descrambled.

Referring now to the drawings and in particular to FIG. 1 and FIG. 2, a system for transmitting and receiving a video signal, according to the present invention, includes apparatus for preventing the video signal from being acceptably displayed by an unauthorized video receiver while maintaining the video signal recoverable by an authorized receiver. While the system may be utilized with video systems including radar, sonar, games, various information, display systems, and the like, the description herein will refer to television systems for ease and simplicity of explanation. Further, while the system is discussed in terms of "over-the-air" television, the system will function equally well with and is directly applicable to cable television systems.

The apparatus includes the video program signal on line 2 being coupled through lines 4 and 8 to a signal scrambling circuit 5 including a surface acoustic wave (SAW) delay line 6 and an attenuator 10. SAW device 6 causes the video signal applied thereto to be delayed a predetermined amount in time. A pulse generator 20 receives the video synchronization signals on conductor 22 and produces synchronized, randomly generated, Q and $\overline{Q}$ switching signals on lines 24 and 26 respectively which are coupled to switches 12 and 14. The synchronization signals on line 22 are ordinarily used to cause the electron beam in the television set to sweep across the television screen from one side to the other in the same manner as they were transmitted and then the synchronization signal causes a retrace of the signal back to the original side but down one line where the sequence is repeated a number of times, for instance 525 lines over a time period of one second, depending upon the television standard being used. Thus, the synchronization signals determine the point in time at which the retrace line is generated and the sweep line is begun again from one side of the television set to the other. When the synchronization signal 22 causes pulse generator 20 to produce a Q pulse on line 24, switch 12 gates or couples the delayed output of SAW device 6 on line 16 to output line 28 which is coupled to a summing unit 32. The same program signal on line 2 is, as stated previously, being coupled through conductor 8 to attenuator 10 which produces an undelayed output on line 18. However, switch 14 is off when the Q pulse on line 24 from pulse generator 20 exists. Thus, only the delayed output of the SAW delay line 6 passes through switch 12 to line 28 and summing unit 32 during the existence of the Q gating pulse. However, when some subsequent synchronization pulse arrives on line 22, pulse generator 20 produces a $\overline{Q}$ signal on line 26 which gates switch 14 on but switch 12 is off because the Q pulse does not exist on line 24. Thus, the undelayed output of attenuator 10 on line 18 passes through switch 14 on line 30 to summing unit 32. The output of the summing unit 32 on line 42 is coupled to transmitter 44 which transmits the recombined scrambled signals on antenna 46. The signal is scrambled because the video program signal in one sweep line is delayed during the Q pulse with respect to the signal on the next sweep line during the $\overline{Q}$ pulse. Thus, alternate portions or sweep lines of the video program signal are delayed with respect to each other.

The delay time through the SAW delay line device 6 differs from the delay time through attenuator 10 by a significant fraction of the horizontal sweep time. In the United States, for instance, with the NTSC (National Television Standardization Committee) broadcast system, the time from the start of one horizontal line to the start of the next horizontal line is approximately 60 microseconds and the retrace interval is approximately 10 microseconds. In such a system, a typical preferred range for scrambling television signals requires a difference in delay times between that caused by SAW delay line and that caused by the attenuator 10 of between approximately 3 and 5 microseconds. SAW delay line device 6 causes that portion (i.e. a sweep line) of the video program signal 2 passing through the delay line 6 to be considerably delayed from that portion (i.e. the next sweep line) passing through the attenuator 10 and thus in the summing unit 32 the two signals are not aligned with each other but are delayed with respect to each other and thus the picture is scrambled. The attenuator 10 attenuates the signal to compensate for the attenuation caused by the SAW device 6. It is to be noted that while the invention is being described in detail with respect to the NTSC system, it is also applicable to other systems, e.g. PAL (Phase Alternation Line) and SECAM (derived from French for sequential with memory).

As stated earlier, pulse generator 20 detects the presence of the television horizontal sweep pulse or synchronization pulse and randomly produces Q and $\overline{Q}$ signals on lines 24 and 26 which are timed with the synchronization pulses on line 22. Pulse generator 20 also drives an interfering signal generator 34 by amplitude modulating (AM) the interfering signal. The modulated interfering signal generator 34 operates on the recombined television signals through summing means 32 in a manner well known in the art and described in U.S. Pat. No. 4,074,311. By modulating the interfering signal produced by generator 34 with pulse generator 20 which detects the horizontal sweep intervals, the information for synchronizing the received signal with the transmitted signal (and which describes the switch times of the delayed and undelayed segments of the signal as it is passed through the SAW delay line 6 and attenuator 10) is transmitted along with the television program signal.

In addition, a system is needed to verify tickets being used at the receivers as valid or invalid. Thus, a verification code generator 38 produces a digital code on line 40 which is summed with the Q switching signal on line 24 by summing unit 33 and coupled to interference generator 34. While the verification code is shown being transmitted on the interference signal carrier, it could also be transmitted on the sound carrier, the picture carrier (during retrace interval) or any other desired carrier. This verification code, as will be explained in detail hereinafter, enables the receiver to verify the validity of an electronic ticket being used to unscramble a signal that is being received. If the ticket is an incorrect or invalid one, the verification code or command causes the ticket to be permanently destroyed, disabled, or deactivated so that it cannot be used then or in the future.

FIG. 2 is a schematic representation of the receiving unit for receiving the scrambled signal being transmitted by transmitter 44 over antenna 46 in FIG. 1. The transmitted video information and other signals are received by antenna 48 in FIG. 2 and coupled to receiver 50 that reproduces the scrambled video signal which is coupled to descrambler 54 by conductor or connection 52. Descrambler 54 includes an electronic ticket 56 which is plugged into the descrambler and forms part of the descrambling circuit which will be described in more detail hereinafter. The received signal cannot be descrambled without the ticket. The descrambled signal is produced on line 58 and coupled to a video display 60 which may be, for instance, a television set.

As stated earlier, it should be noted that while FIG. 1 discloses an antenna transmitting over-the-air signals, the same principles involved in the present invention could be used equally well in a cable system instead of a transmitter 44. In that case, the signals on line 42 would be coupled to the cable system and then to the display devices such as television sets connected thereto.

Thus, the system incorporating the present invention provides intelligible video program signals and corresponding video synchronization signals to authorized video receivers or displays only and comprises transmitting means 44 for transmitting scrambled signals of at least one video program, a receiver 50 for receiving the scrambled video program signals, and a descrambling unit 54 coupled to the receiver 50 and including a removable electronic ticket 56 for intercepting and at least partially descrambling the video program signal from receiver 50 and recovering the synchronization signals. The output of the descrambling unit 54 on line 58 is coupled to the input of video display 60 for coupling the recovered synchronization signals and the descrambled, intelligible video program signals to the video display 60.

The descrambling unit 54 will be discussed in relation to FIG. 3 wherein the scrambled signal from receiver 50 on line 52 (as shown in FIG. 2) is coupled to the descrambler 54 and in particular to an RF amplifier 62. The output of the RF amplifier 62 is coupled to an electronic ticket 56 through connections 64. The output of RF amplifier 62 is also connected through line 70 to an attenuator 72 in the descrambling unit 54. The electronic ticket 56 has thereon circuitry for at least partially descrambling the received signal and is a unitary package which plugs into or is insertible into the descrambler 54 at junction or contact points 64, 82, 86 and 124. The signal passing through junction 64 to electronic ticket 56 is coupled through line 66 to a band pass filter 68 and through line 74 to a SAW delay device 76.

Band pass filter 68 recovers the synchronization signals and the interfering signal that is produced by generator 34 in FIG. 1. It also assists in recovering the verification code signal produced by generator 38 in FIG. 1. The output of band pass filter 68 on line 84 is coupled through connections 86 of electronic ticket 56 to demodulator 90 in descrambling unit 54. Demodulator 90 produces Q and $\overline{Q}$ signals on output lines 104 and 106 respectively. It will be noted that, as compared to the switching process in the transmitter of FIG. 1, the Q signal on line 104 gates or controls RF switch 102 through switch driver 112 for attenuator 72 while the $\overline{Q}$ signal is coupled to drive or control RF switch 88 through switch driver 108 for SAW device 76. Thus, whereas the delayed signal passing through the SAW delay line 6 of the scrambler unit 5 in FIG. 1 is gated by the Q signal, in the descrambler unit 54 the delayed output of the SAW device 76 on line 78 to RF switch 88 in FIG. 3 is gated by the $\overline{Q}$ signal in FIG. 3. The received signal which was not delayed by attenuator 10 in the transmitter of FIG. 1 is now delayed through SAW device 76 and gated by switch 88 to cause it to be aligned with the formerly delayed signal now being gated through attenuator 72 and the signal is descrambled. Thus, the outputs of the SAW delay line 76 and attenuator 72 in FIG. 3 in the descrambler unit 54 are switched and combined in a manner complimentary to the switching between the original SAW delay line 6 and attenuator 10 in the transmitter of FIG. 1. This means that the total delay time of each horizontal sweep through the entire system remains substantially constant and the scrambled signal is descrambled.

Thus, the electronic ticket 56 is used for at least partially descrambling transmitted video program signals and providing synchronization signals for use in a video receiver 60. The scrambled video signals are received on first terminal 64 of ticket 56 and are coupled to delay line 76, a portion of the descrambling circuit. Since SAW delay line 76 delays successive alternate portions of the scrambled video signal, the signal is partially descrambled and that portion of the descrambled signal and the recovered synchronization signals from band pass filter 68 are coupled to second terminals 82 and 86. These outputs on second terminals 82 and 86 are coupled to video receiver 60 by notch filter 118.

The output of SAW delay device 76 is coupled on line 78 directly through fuse 80 which will be discussed in more detail hereinafter. However, suffice it to say at this point that the fuse 80 is constructed as a part of the electronic ticket 56 and is in the video signal path 78 and is used to deactivate or destroy the usability of electronic ticket 56 if it is not a valid ticket for a particular video program. This will be discussed in more detail hereinafter.

The variable attenuator 72, represented by arrow 92, is used to balance the system and allow for variations in insertion loss of the SAW delay line 76. It is realized with a variable resistor and two fixed resistors in a "pi" configuration, the variable resistor being the series leg of the "pi" (one of a number of ways in which the desired result could be obtained and all of which are also well known in the art).

The output of attenuator 72 on line 94 is coupled to phase shifter 96 which is also adjustable as represented by arrow 98. The variable phase shifter 96 is used to match variations in phase shift from one electronic ticket to the other as may be required. It can also be constructed in a number of well known ways but preferably consists of variable coils and/or capacitors in a ladder or lattice network in a manner well known in the art. Thus, both amplitude and phase can be adjusted by the user of the descrambler during a period prior to the occurrence of the event or program. A test pattern is transmitted with a one or two color constant signal scrambled with a fixed, switch pattern in each frame. The amplitude is adjusted with the attenuator adjustment 92 to eliminate any "venetian blind" effect on the screen and the phase is adjusted by phase adjustment 98 to match colors between bars across the screen. Once adjusted, the controls are then left alone for the balance of the event. A diagrammatic representation of the set top descrambler is shown in FIG. 7 with knobs 192 and 194 representing the adjustments for attenuator 72 and phase shifter 96 respectively.

As stated earlier, the band pass filter 68 on electronic ticket 56 removes the picture carrier, the sound carrier and video frequency modulation carrier components from the interfering signal frequency which is also used to carry the timing information or synchronizing signals for driving switches 88 and 102 to reconstruct the video signal. In addition, the band pass filter 68 removes the ticket coding or verification information and couples it to demodulator 90 and then to the decoder 126 on line 128. The decoder 126 compares the verification code transmitted by generator 38 in FIG. 1 on the interfering carrier signal with the code in the ticket lead frame or hard wired ROM 122 representing a particular ticket through the third set of terminals or ticket output leads 124. The decoder produces an output signal on 130 which destroys unauthorized tickets by activating the ticket destruct electronics in switch driver and destruct circuitry 108 which drives RF switch 88 as will be discussed hereinafter.

The outputs of RF switch 88 and RF switch 102 are combined on line 116 and represent the descrambled video signal which is to be used by the video receiver such as a television set. The combined signal is coupled to notch filter 118 which removes the interfering signal as described in U.S. Pat. No. 4,074,311.

Thus, the apparatus for descrambling the transmitted, scrambled video program and providing synchronization signals for use in a video display comprises the descrambler 54 with a receptacle 186 for receiving an electronic ticket 56. The descrambler 54 has first terminals 52 for receiving the transmitted scrambled video signal and second terminals 58 for coupling the unscrambled signal to display 60 for viewing. The electronic ticket 56 is inserted in receptacle 186 and has circuitry 68, 76 for connection to descrambler 54 for receiving the scrambled signals. The circuitry 68, 76 in electronic ticket 56 is necessary for descrambler 54 to descramble the received video signal. The output from SAW delay line circuitry 76 is a partially descrambled signal which is coupled to second terminals 58 through notch filter 118 and RF switch 88 for coupling to video display 60. Descrambler 54 also includes means such as decoder 126 which is coupled to electronic ticket 56 for verifying an authorized electronic ticket 56 inserted in receptacle 186. Further, a circuit including fuse 80, RF switch 88 and switch driver and fuse destruct circuitry 108 is coupled to the decoder 126, the ticket verifying means, and the ticket 56 for deactivating any unauthorized ticket 56 inserted in receptacle 186.

The band pass filter 68 in electronic ticket 56 receives and recovers the interfering carrier and its modulation components which contains the ticket verification digital code. The electrical connections 124 on ticket 56 are formed in a predetermined digitally coded connection pattern on said ticket 56 in conformance with the verification code so that an authorized ticket can be determined. The decoder 126 is coupled to connections 124 and also receives and decodes the transmitted verification code from demodulator 90 on line 128 and compares the digitally coded connection pattern of connections 124 to said transmitted verification code and produces an output signal on line 130 if the ticket 56 is unauthorized. Means, such as fuse 80, in ticket 56 responds to the output signal on line 130 and deactivates the unauthorized ticket 56 by melting.

Figure 4:
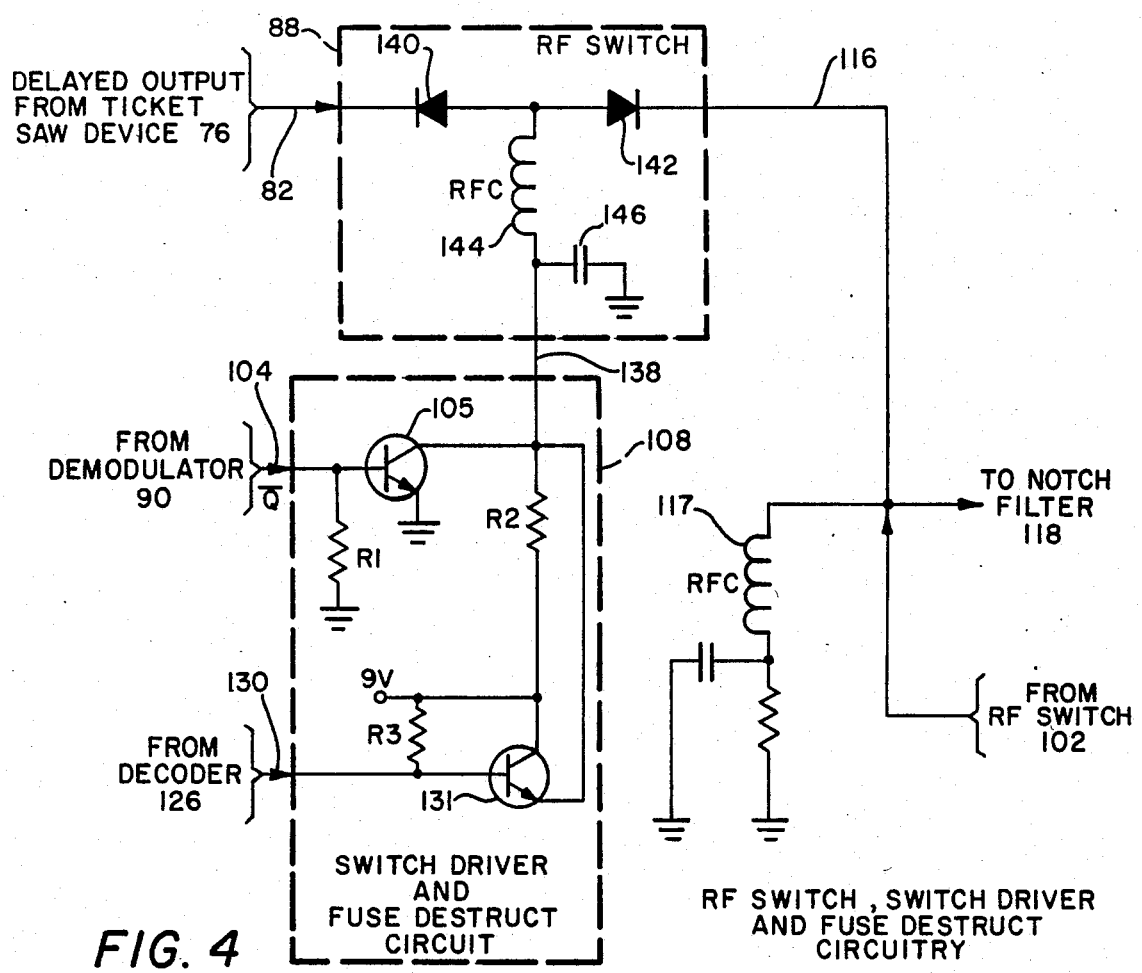
FIG. 4 is a circuit diagram of a switch driver and ticket destruct circuitry which switches the descrambled signal and which can destroy an invalid ticket that is being used to descramble a received signal.

The detailed construction of the RF switch, switch driver and fuse destruct circuitry is shown in FIG. 4. The $\overline{Q}$ output from demodulator 90 on line 104 is coupled to transistor 105 in the switch drive portion of circuit 108 which in turn drives the RF switch 88 with direct current passing through diodes 140 and 142 and RF choke 144. Thus, RF switch 88 is gated "on" when the $\overline{Q}$ signal from demodulator 90 is present on line 104 and the delayed signal from the SAW device 76 is allowed to pass to notch filter 118. When the $\overline{Q}$ signal is not present, diodes 140 and 142 are reverse biased and are gated "off" and no delayed signal from the SAW device 76 is allowed to pass to notch filter 118 on line 116. RF choke 117 and its associated resistor and capacitor provide a return path for the d.c. current which biases diode 142.

Figure 5:
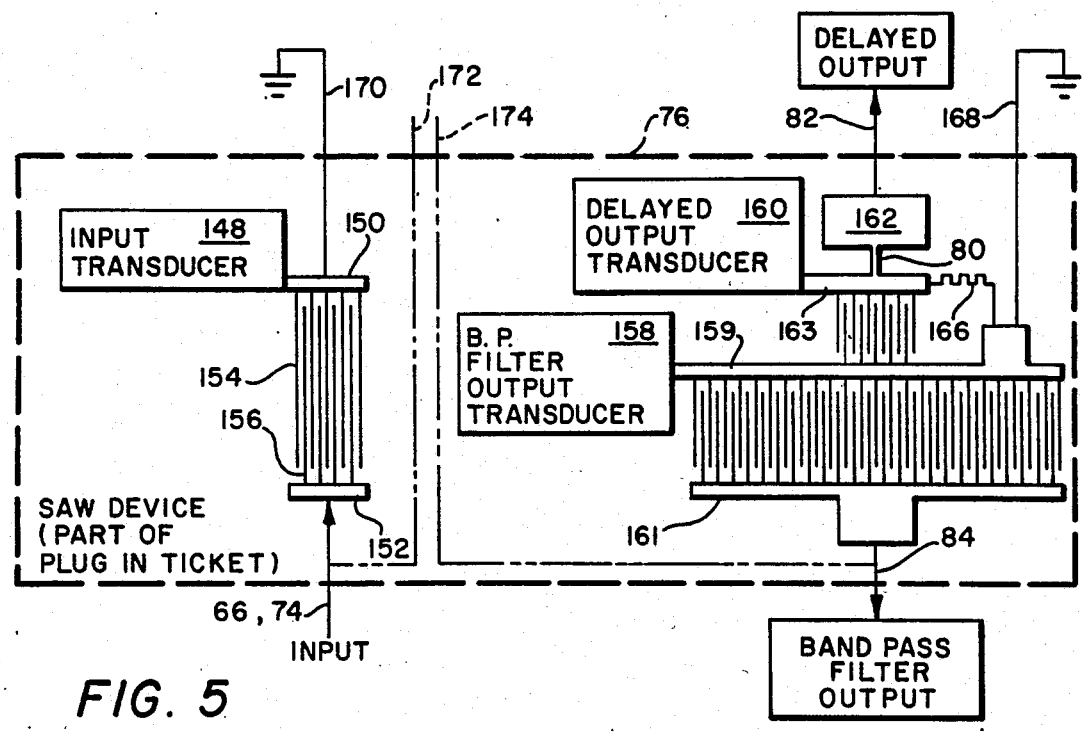
FIG. 5 is a diagrammatic representation of a surface acoustic wave device which forms part of the electronic ticket for descrambling the received signal.

The current through diode 140, which is connected directly to electronic ticket 56 through RF switch 88, also passes through the SAW device 76 to ground potential to complete the circuit. This will be seen more clearly with respect to FIG. 5. The dimensions of the fuse 80 on the SAW device 76 as shown in FIGS. 5 and 6 are carefully controlled so that the switch 88 drive current does not normally damage the fuse. However, when the decoder chip 126 commands the destruction of a ticket by declamping its output on line 130 from ground, resistor R3 in the fuse destruct portion of circuit 108 drives current into the base of associated transistor 131 which in turn drives excessive additional current through diode 140 and fuse 80 resulting in the destruction of the fuse. Since the fuse 80 is in the video signal path or circuit, once it is destroyed or fused, the electronic ticket 56 is no longer usable.

Also, if the destruct command (verification signal from the transmitter) is comprised of an invalid code and transmitted at the end of the broadcast, all valid tickets for that broadcast would be destroyed as rendered unusable for future use. Thus, invalid tickets are rendered unusable at the start of a program and all the tickets in use at the end of the program are rendered permanently unusable.

Referring now to FIG. 5 which is a diagrammatic representation of the SAW delay device chip 76, it will be seen that the input signal is applied to input transducer 148 on lead 66, 74 which is coupled to an input bonding pad 152. The output of input transducer 148 on bonding pad 150 is coupled to ground potential through conductor 170. Each of the pads 150 and 152 have fingers 154 and 156 which are placed in an interdigitated manner to form input transducer 148 in a manner well known in the art.

Figure 3:
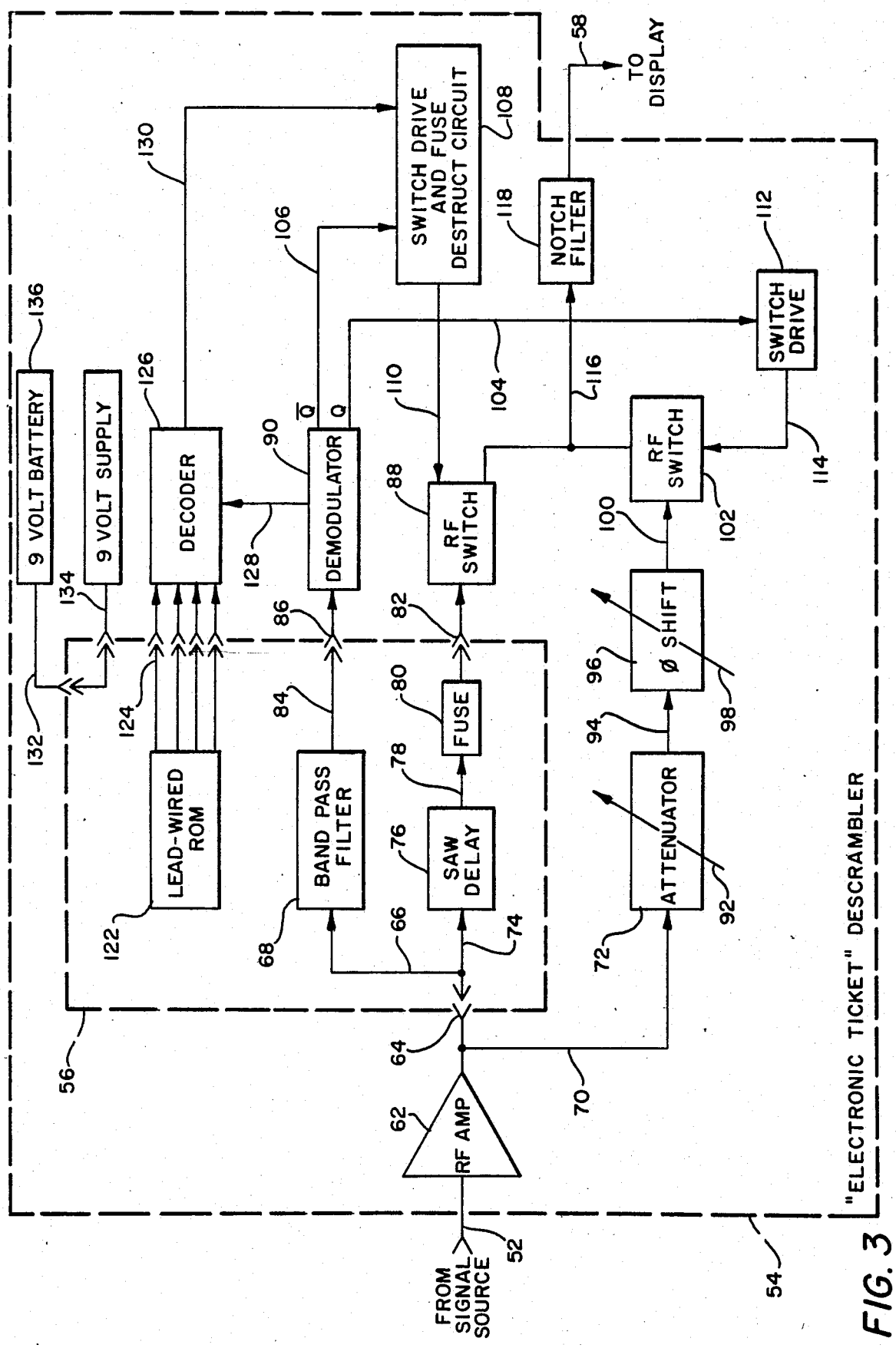
FIG. 3 is a schematic diagram of the descrambler with the electronic ticket which is used in the receiver circuit to provide an intelligible video signal to a video display such as a television set.

The band pass filter transducer 158 in FIG. 5 is the same unit designated band pass filter 68 in FIG. 3 and may be formed on the same SAW device 76 as the input transducer 148 as shown. Band pass filter transducer 158 has an output developed between output line 84 connected to bonding pad 161 and ground connection 168 which is connected to bonding pad 159. The bonding connection pads 159 and 161 on band pass filter transducer 158 also have interdigitated fingers which form the band pass filter in a manner well known in the art.

In addition, the delayed signal output is produced by transducer 160 which has a bonding connection pad 163 having interdigitated fingers with bonding pad 159 to form the delay line as is well known in the prior art. The output of transducer 160 is coupled through a fuse link 80 to an output bonding connection pad 162 which produces the delayed output on connection 82. Thus, the band pass filter output transducer 158 and the delayed signal output transducer 160 are formed on the same SAW device or chip 76.

It will also be noted in FIG. 5 that an electrical connection, including meandering line 166, exists between bonding pad 163 of delayed output transducer 160 and ground connection 168. This meandering line 166 acts as a high impedance at RF frequencies and is the equivalent of an inductance and resistance in series. However, it has a low resistance to d.c. current flow. Thus, it effectively isolates bonding pads 159 and 163 at RF frequencies but directly couples them for direct current flow.

As stated earlier with respect to FIG. 4, when the demodulator 90 produces a $\bar{Q}$ output indicating that RF switch 88 is to be gated "on", it drives the RF switch 88 through transistor 105 in switch driver 108 to cause the direct current to pass through diodes 140 and 142 in RF switch 88 and thus turn the gate "on". The direct current from diode 140 which is connected directly to the ticket on line 82 passes through bonding pad 162 in FIG. 5 and fuse 80 through meandering line 166 to ground 168. The physical dimensions of fuse 80 are carefully controlled so that the switch drive current through transmitter 105 does not normally damage the fuse 80. However, when the decoder chip 126 commands the destruction of a ticket by declamping its output from ground, resistor R3 in switch drive and fuse destruction unit 108 shown in FIG. 4 drives current into the base of the transistor 131 which in turn drives substantially more current through diode 140, line 82, fuse 80 and meandering line 166 to ground 168 (FIG. 5) resulting in the destruction of the fuse. Since the fuse 80 is a part of the electronic ticket and is directly in the RF path from the output 163 of the delay line transducer 160 to junction point or bonding pad 162, the ticket 56 is rendered inoperative permanently.

The details of the construction of the electronic ticket 56 including the SAW delay line 76 and the band pass filter 68 formed on a crystal substrate 57 coterminous with the periphery of ticket 56 and the formation of read only memory (ROM) 122 for ticket verification are disclosed in FIG. 6. Thus, the construction of the electronic ticket 56 utilizes a lead frame construction that is well known in the art. The electronic ticket is shown in FIG. 6 by dotted lines 56 and includes thereon the combined SAW delay line 76 and band pass filter 68 as well as the ROM 122. The SAW device including band pass filter 68 and delay line 76 include leads 66, 74 and ground lead 170 for receiving the scrambled video input from RF amplifier 62 in FIG. 3. Also on the SAW device is band pass filter output connection 84, ground connection 168 and SAW delay line device output connection 82. The fuse 80 is shown located between bonding pads 162 and 163 and meandering line 166 is located between bonding pads 159 and 163. These connections are all coupled to the leads from frames 176 and 178.

In addition, the ROM 122 consists of four leads designated as bit 1, bit 2, bit 3, and bit 4 extending from the lead frames 176, 178 to the electronic ticket 56. It will be noted that only bit 3 is actually attached to the ground line connection 168. Thus, the code that would be detected by decoder 126 in FIG. 3 is 0100 in which bit 4 is the first 0, bit 3 is the 1, bit 2 is a 0 and bit 1 is a 0. It will be noted that this construction provides sixteen different digital combinations which can be formed by connecting various ones of the four bits to the ground plane or connection 168. Thus, those leads attached to the ground bus 168 are interpreted by the decoder circuitry 126 as a 1 while those not so connected are interpreted as a 0. The decoder chip 126 is of the same type as used in today's security and garage door opener receivers and is well known in the art. Thus, the physical configuration or arrangement of the leads or connections must be physically configured in conformance with the verification code to represent a valid ticket. A particular ticket can then be required in order to view a particular event. Invalid tickets will be destroyed.

Figure 9:
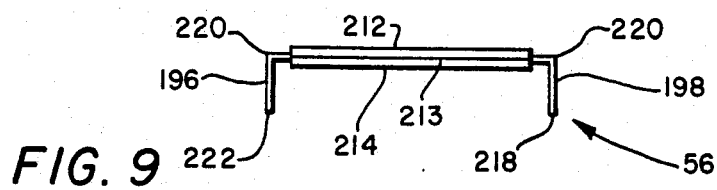
FIG. 9 is an end view of the electronic ticket shown in FIG. 8.
Figure 10:
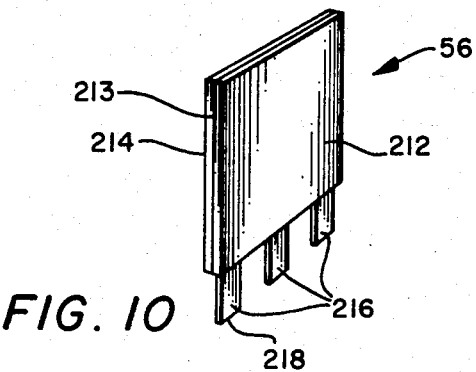
FIG. 10 is a representation of an alternative embodiment of an electronic ticket wherein the leads for conducting signals are on one side of the ticket only.

As stated earlier, the lead frame construction shown in FIG. 6 is also well known in the art. However, in packaging a SAW device such as SAW device 76 in a lead frame, care must be taken to protect the surface of the crystal 57 (on which the connection pads are bonded) from contact by the plastic encapsulating the device. A two piece plastic case indicated by dashed lines 56 representing the electronic ticket encapsulates the descrambling circuit (delay line 76 and band pass filter 68) the ROM and at least a portion of the electrically conductive terminals 179 on the lead frame 176, 178. The two piece plastic case is welded along coterminous edges and once the welding is complete, the lead frames are broken or sheared off along lines 180 and 182 designated as shear planes in FIG. 6. The welding of the plastic case can be done in several ways, possibly in one instance with ultrasound. After the lead frames 176, 178 are sheared off, the remaining portion of the leads 179 extending outwardly from the encapsulated electronic ticket 56 are bent over at right angles and the electronic ticket is an enclosed unitary package which may be used as a removable plug-in unit. FIG. 8 and FIG. 9 disclose this concept. For this electronic ticket 56, it also may be preferable to bring all of the leads out on one side to facilitate easy plug in operation as shown in FIG. 10. This is represented in FIG. 5 by dotted lines 172 and 174 which suggest that the input leads to the SAW device on 66, 74 could extend out on the other side of the SAW chip 76 along line 172 while the output lead 84 from the band pass filter circuit 158 could also be extended along line 174 to exit the SAW chip 76 on the same side as the other leads. Thus, all connections would be on the same side in that case. As indicated earlier, this concept is also illustrated in FIG. 10.

This technique for packaging the SAW device 76 uniquely provides security against tampering. Once the lead frames 176 and 178 as shown in FIG. 6 have been removed, removing the plastic housing or encapsulation covering the ticket 56 leaves the active or nongrounded leads (66, 74, 82, 84) supported only by the bond wires going to the SAW pads. These wires are typically 0.0005 to 0.001 of an inch in diameter and cannot support the weight of the lead, much less the torque or tension likely to be applied to remove the plastic. Thus, these connections to the external terminals would be destroyed. Even if a person could successfully open the plastic package and determine how the unit is constructed, the unit could not be easily duplicated because the thin metal on the surface of the crystal cannot be easily wired. A semiconductor like wire bonding machine is required and is not commonly available to the public. Thus, the descrambling circuit formed in the unitary package as indicated above will be physically destroyed if the unitary package is attempted to be opened or tampered with.

Further, a 9 volt d.c. battery power supply 136 as shown in FIG. 3 is required in the descrambler unit 54 to power the descrambler unit and activate the fuse destruct circuit as seen in the switch drive and fuse destruct circuit 108 in FIG. 4. That 9 volt battery 136 may be coupled from the descrambler 54 on lead 132 through a contact into the ticket 56 as shown in FIG. 3, thus conserving battery power when no ticket is inserted. However, alternatively, a 9 volt d.c. power supply which is obtained from an external source 134 may be plugged in to the descrambling unit 54 and thus the battery eliminated. Either source, of course, can be used.

FIG. 7 is a diagrammatic representation of a descrambler unit 54. The incoming scrambled video signals on cable 52 are coupled internally to the circuits shown in FIG. 3 as shown schematically by lead or connection 200. The output from the circuit shown in FIG. 3 is coupled through connection 202 in FIG. 7 to conductor 58 for transmission to the video receiver 60 in FIG. 2. The descrambler 54 includes a receptacle 186 having connections 188 therein for the insertion of a ticket. Such a ticket is shown in FIG. 10 which has all of the connections extending from one side of the ticket only. In the event that a ticket having leads extending from both sides such as that shown in FIG. 8 or FIG. 9 is used, an additional receptacle 190 (shown in dashed lines) having connections 187 therein is formed in the descrambler 54 thus allowing the dual inline package type electronic ticket to be utilized. Also, on descrambler unit 54 are located the attenuator control knob 192 and the phase shift control knob 194. These controls, as explained earlier, allow the owner of the descrambling unit to adjust his unit for both attenuation and phase shift prior to the beginning of any program.

The invention therefore also relates to a method of descrambling video program and synchronization signals for use in a video display comprising the steps of providing partial descrambling circuitry having first terminals 52, 200 for receiving the scrambled video signal and second terminals 58, 202 coupled to the video display 60, coupling an electronic ticket 56 containing the balance of said descrambling circuitry 68 and 76 to said partial descrambling circuity for forming a complete descrambling unit which descrambles the received video signal and couples the descrambled video signal to second terminals 58, 202 for transfer to the video display.

FIG. 8 discloses a diagrammatic representation of a dual inline pin electronic ticket 56 having the SAW devices thereon and having external leads 196 and 198 extending outwardly and downwardly therefrom to form the dual inline pin plug-in module.

An end view of the dual inline electronic ticket shown in FIG. 8 is also shown in FIG. 9. Electronic ticket 56 is encapsulated by two plastic halves 212 and 214 which are bonded together as by ultrasound or other well known means along their adjoining edges 213. The leads 196 and 198 extend from both sides of the electronic ticket 56 and are bent downwardly at right angles at point 220. The ends 218 and 222 of the leads 198 and 196 are the points where the lead frames were broken off as described earlier in reference to FIG. 6.

In like manner, in FIG. 10, the electronic ticket 56 is shown with the leads 216 extending from one side thereof only. Again, the ticket is formed of plastic halves 212 and 214 which are bonded together at their common edges 213. Also, the ends of the leads 216 at 218 are the points where the lead frames are broken off as described previously in relation to FIG. 6.

Thus, the invention also relates to a method of constructing a low cost, mass producible electronic ticket 56 for descrambling transmitted video program and synchronization signals for use in a video receiver 60 comprising the steps of forming at least a portion 68, 76 of a descrambling circuit on a substrate 57, forming a lead frame 176, 178 having electrically conductive terminals 179 thereon, electrically attaching said descrambling circuit 68, 76 to predetermined ones of said conductive terminals 179 on lead frame 176, 178 and encapsulating 56 said descrambling circuit 68, 76 and at least a portion of the electrically conductive terminals 179 on lead frame 176, 178 to form a unitary package.

Figure 11:
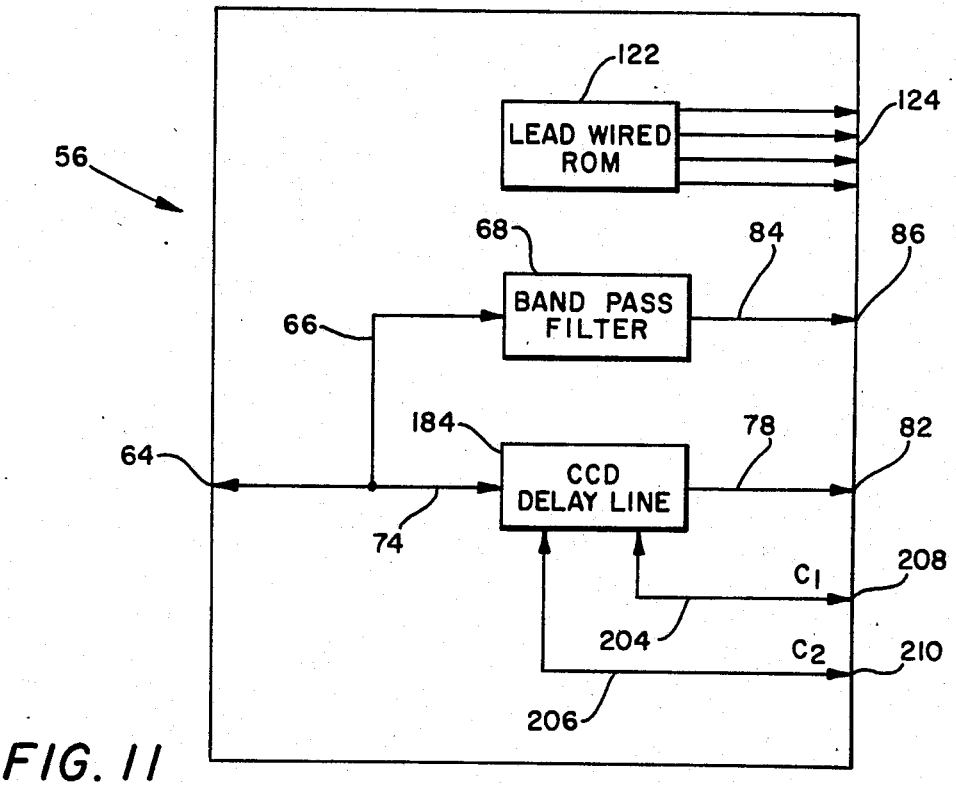
FIG. 11 is a diagrammatic representation of an alternative embodiment of the electronic ticket for descrambling the received video signal.

FIG. 11 is a diagrammatic representation of an alternative form of electronic ticket 56 using a charge coupled device (CCD). CCD's operate at a lower frequency than SAW devices and will require the use of demodulators to translate received frequency into the frequency range of the CCD as is well known by those who are skilled in the art. In this case, the SAW device 76 shown in FIG. 3 is replaced with a charge coupled delay line 184 which produces an output on line 78 to connection 82. As is well known in the art, the delay time of a charge coupled device can be changed simply by changing the clock frequency applied to the charge coupled device. In this case, the clock frequency cn line 204 from connection 208 differs from the clock signal on line 206 from connection 210. These clock signals can be switched by the output signals developed from band pass filter 68 on line 84 to demodulator 90 as explained earlier in relation to FIG. 3. Thus, as shown in FIG. 3 demodulator 90 produces the Q and $\bar{Q}$ on lines 104 and 106 respectfully which would be used to switch the clock from one frequency to the other and apply them alternately to the charge coupled device 184 on lines 204 and 206. In all other respects, the electronic ticket 56 as shown in FIG. 11 would operate as disclosed earlier. No attenuator or phase shifter will be required. It is apparent that the hard wired ROM 122 as shown in FIGS. 6 and 11 could be constructed in any manner well known in the art instead of by the lead frames as shown in FIG. 6. In addition, the band pass filter 68 would not have to be a SAW device but could be constructed in any other well known manner. It is also understood by those skilled in the art that the function of the CCD can be provided by means of an A-D converter, digital shift registers and D-A converters connected in tandem.

Thus, the present invention has disclosed a novel method and apparatus for using a low cost, mass producible electronic ticket which is designed to adapt a particular ticket for a particular show to prevent a television signal from being acceptably received by an unauthorized television receiver while maintaining the television signal recoverable by an authorized receiver utilizing one of the electronic tickets. Such tickets can easily be sold in supermarkets, drug stores, convenience stores and the like.

It is understood that suitable modifications may be made in the structure as disclosed provided such modifications come within the spirit and scope of the appended claims.

Having now, therefore, fully illustrated and described our invention, what we claim to be new and desire to protect by letters patent is:

1. A method of descrambling received RF TV signals with transmitted synchronization signals for use in a video display receiver comprising the steps of:
   a. providing partial RF TV signal descrambling circuitry having first terminals for receiving said scrambled RF TV signals and second terminals coupled to said video display receiver; and
   b. coupling an electronic ticket containing the balance of said RF TV signal descrambling circuitry to said partial descrambling circuitry for forming a complete descrambling unit which utilizes said synchronization pulses to descramble said received RF TV signal and couples said descrambled RF TV signal to said second terminals for transfer to said video display receiver.

2. A method as in claim 1 further including the steps of:
   a. verifying authorized electronic tickets coupled to said partial descrambling circuitry; and
   b. deactivating any unauthorized electronic ticket coupled to said partial descrambling circuitry.

3. A method as in claim 1 further comprising the step of:
   a. forming said balance of said descrambling circuitry as a surface acoustic wave delay line device; and
   b. including said surface acoustic wave delay line device as part of said electronic ticket.

4. A method as in claim 2 further including the step of forming means on said electronic ticket for recovering said synchronization signals.

5. A method as in claim 4 further including the step of forming said synchronizing signal recovering means on said surface acoustic wave device.

6. A method as in claim 5 further including the step of forming both said scrambling delay line circuitry and said synchronizing signal recovery means on a common surface of said acoustic wave device.

7. A method of descrambling transmitted, scrambled RF TV and synchronization signals for use in a video display receiver comprising:
   a. providing a descrambler unit with a receptacle therein for receiving an electronic ticket, said descrambler having first terminals therein for receiving said transmitted scrambled RF TV signals and second terminals for coupling said descrambled signals to said video display receiver for viewing;
   b. inserting an electronic ticket in said receptacle, said ticket having circuitry for connection to said descrambler unit, said circuitry being necessary for said descrambler unit to descramble said received video signals and couple said descrambled RF TV signals to said second terminals for coupling to said video display;
   c. means coupled to said ticket for verifying an authorized ticket inserted in said receptacle; and
   d. means coupled to said verifying means and said ticket for deactivating any unauthorized ticket inserted in said receptacle.

8. A method as in claim 7 further including the steps of:
   a. receiving a ticket verification digital code with said transmitted, scrambled RF TV signals;
   b. forming electrical connections on said electronic ticket in a predetermined digitally coded pattern in conformance with said digital verification code to represent an authorized ticket;
   c. comparing said electrical connection pattern with said transmitted digital verification code whereby an output signal is generated if said ticket is unauthorized; and
   d. deactivating an unauthorized ticket if said output signal is generated.

9. A method as in claim 7 further comprising the steps of:
   a. forming said ticket descrambling circuitry as a surface acoustic wave delay line device; and
   b. including said surface acoustic wave device as part of said electronic ticket.

10. A method as in claim 9 including the step of forming means on said electronic ticket for recovering said synchronization signals.

11. A method as in claim 10 further including the step of forming said synchronizing signal recovering means on a surface acoustic wave device.

12. A method as in claim 11 further including the step of forming both said descrambling circuitry and said synchronizing signal recovering circuitry on a common surface acoustic wave device.

13. Apparatus for descrambling a transmitted, scrambled RF TV signal with synchronization signals for use in a video display receiver comprising:
 a. a descrambler with a receptacle for receiving an electronic ticket, said descrambler having first terminals therein for receiving said transmitted scrambled RF TV signal and second terminals therein for coupling a descrambled signal to said display for viewing; and
 b. an electronic ticket for insertion in said receptable, said ticket having RF TV signal descrambling circuitry for connection to said descrambler for receiving said scrambled RF TV signal, said ticket being necessary for said descrambler to recover and utilize said synchronization signals to descramble said received RF TV signal and provide said descrambled RF TV signal for coupling to said display.

14. Apparatus as in claim 13 further including:
 a. means for receiving a ticket verification digital code with said transmitted RF TV signals,
 b. electrical connections formed in a predetermined digitally coded connection pattern on said electronic ticket in conformance with said verification code to represent an authorized ticket;
 c. means coupled to said connections and receiving said transmitted verification code and comparing said digital coded connection pattern to said verification code and producing an output signal if said ticket is unauthorized; and
 d. means in said ticket for responding to said output signal and deactivating said unauthorized ticket.

15. Apparatus as in claim 13 further including a surface acoustic wave device formed in said electronic ticket as said circuitry necessary for said descrambler to descramble said RF TV signal.

16. Apparatus as in claim 15 further including means on said electronic ticket for recovering said synchronization signals.

17. Apparatus as in claim 16 wherein said synchronization signal recovering means is a surface acoustic wave device.

18. Apparatus as in claim 17 wherein said descrambling circuitry and said synchronizing signal recovery means are formed on the same surface acoustic wave device.

19. In apparatus for transmitting scrambled RF TV signals and associated synchronization signals and receiving and descrambling said scrambled RF TV signals with said synchronization signals for selected use by a video receiver, a descrambling device comprising:
 a. descrambling means having an input coupled to receive said scrambled RF TV signals and an output for coupling said descrambled RF TV signals to said video receiver; and
 b. an electronic ticket removably coupled to said descrambling means such that scrambled RF TV signals are descrambled with the use of said synchronization signals by RF TV signal circuit means on both said ticket and said descrambling unit in combination and the descrambled RF TV signals are coupled to said video receiver for viewing.

20. Apparatus as in claim 19 wherein said ticket descrambling means is formed from a surface acoustic wave device.

21. Apparatus as in claim 20 further including means on said ticket for recovering said synchronization signals.

22. Apparatus as in claim 21 wherein said synchronizing signal recovery means is formed from a second surface acoustic wave device.

23. Apparatus as in claim 21 wherein said ticket descrambling means and said synchronizing signal recovery means are both formed on a common surface acoustic wave device.

* * * * *